United States Patent [19]

Meyer, III

[11] Patent Number: 5,504,978
[45] Date of Patent: Apr. 9, 1996

[54] LOCKING CLAMP ASSEMBLY

[76] Inventor: Harold A. Meyer, III, 9 Ballou St., Cumberland, R.I. 02864

[21] Appl. No.: 275,265

[22] Filed: Jul. 15, 1994

[51] Int. Cl.⁶ .............................. B65D 63/00; F16L 33/00
[52] U.S. Cl. .............................. 24/274 R; 24/269; 24/279; 411/515
[58] Field of Search .................... 24/274 R, 274 WB, 24/279, 269, 282; 411/515, 514, 513

[56] References Cited

U.S. PATENT DOCUMENTS

| | | | |
|---|---|---|---|
| 1,768,720 | 7/1930 | Taylor | 411/515 |
| 2,697,570 | 12/1954 | Snyder | 24/279 |
| 2,874,440 | 2/1959 | Kalikow et al. | 24/279 |
| 2,874,441 | 2/1959 | Duane | 24/279 |
| 3,118,210 | 1/1964 | Schukraft | 24/281 |
| 4,155,574 | 5/1979 | Hulsey | 24/274 R |
| 4,379,359 | 4/1983 | Young | 24/273 |
| 4,468,842 | 9/1984 | Perry et al. | 24/279 |
| 4,480,359 | 11/1984 | Koster | 24/270 |
| 4,675,949 | 6/1987 | DaCosta | 24/269 |
| 4,819,307 | 4/1989 | Turner | 24/274 |
| 4,956,898 | 9/1990 | Miyamura et al. | 24/274 R |

FOREIGN PATENT DOCUMENTS

| | | | |
|---|---|---|---|
| 0536267 | 5/1941 | United Kingdom | 24/274 R |
| 0914349 | 1/1963 | United Kingdom | 24/274 R |

*Primary Examiner*—Victor N. Sakran
*Attorney, Agent, or Firm*—Salter & Michaelson

[57] ABSTRACT

A locking clamp assembly includes a circular band of flexible material having, first and second end portions and a series of indentations formed in the outer surface of the band along the length of the band at the first end portion. A housing is mounted on the second end portion of the band and has a channel formed therein which receives the first end portion of the band therethrough. A screw is also disposed within the channel and has a threaded portion with a plurality threads which threadably engage the indentations of the first end portion of the band so that when the screw is turned, the band is tightened and loosened. A locking device releasably locks the screw to the housing its desired position wherein the screw is prohibited from turning thereby preventing the tightening or loosening of the band.

1 Claim, 2 Drawing Sheets

LOCKING CLAMP ASSEMBLY

BACKGROUND AND SUMMARY OF THE INVENTION

This invention relates generally to clamping assemblies, and more particularly to a locking clamp assembly for attaching separate parts, such as a hose to a fitting.

This invention is in the same general field as conventional clamping assemblies having a flexible metal or rigid plastic band which has a series of indentations or openings formed in the band, along the length of the band, at one of its ends. Mounted on an end of the band is a housing having a channel which receives the free end of the band therethrough. The channel also receives therein a screw having a threaded portion with a plurality threads which threadably engage the indentations of the band so that upon turning of the screw, the band tightens around the hose or tubular members extending into the band so as to secure them together.

A disadvantage associated with the aforementioned clamping assembly is that the screw has a tendency to back off (i.e., become loose) after a period of time. Thus, there is a risk that the clamping assembly will loosen and the hose or parts which are attached will come apart. In this prior art clamping assembly, there is no means of ensuring that the screw is maintained in its tightened position.

The present invention overcomes the disadvantages associated with prior clamping assemblies by providing a locking clamp assembly comprising a circular band of flexible material having first and second free end portions and a series of indentations formed in the band along the length of the band at the first end portion. A housing is mounted on the second end portion of the band and has a channel formed therein which receives the first end portion of the band therethrough. A screw, disposed within the channel, has a threaded portion with a plurality threads which are received in the indentations of the first end portion of the band for holding the first end portion in a fixed relation with respect to the housing. The screw is turned for tightening and loosening the band by decreasing and increasing the circumferential extent thereof. A locking device releasably locks the screw to the housing in a position wherein the screw is prohibited from turning thereby preventing further tightening or loosening of the band.

Among the several objects of the present invention are the provision of a locking clamp assembly for clamping separate hose parts together which is designed to maintain a consistent clamping force even after an extended period of time; the provision of such a clamp assembly having releasable locking means which may be selectively locked for preventing the over tightening or unwanted loosening of the clamp assembly; and the provision of such a clamp assembly which is of simple construction and easy to use.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

Corresponding reference numerals designate corresponding parts throughout the several views of the drawings.

DETAILED DESCRIPTION OF THE PREFERRED EMBODIMENT

Figure 1:
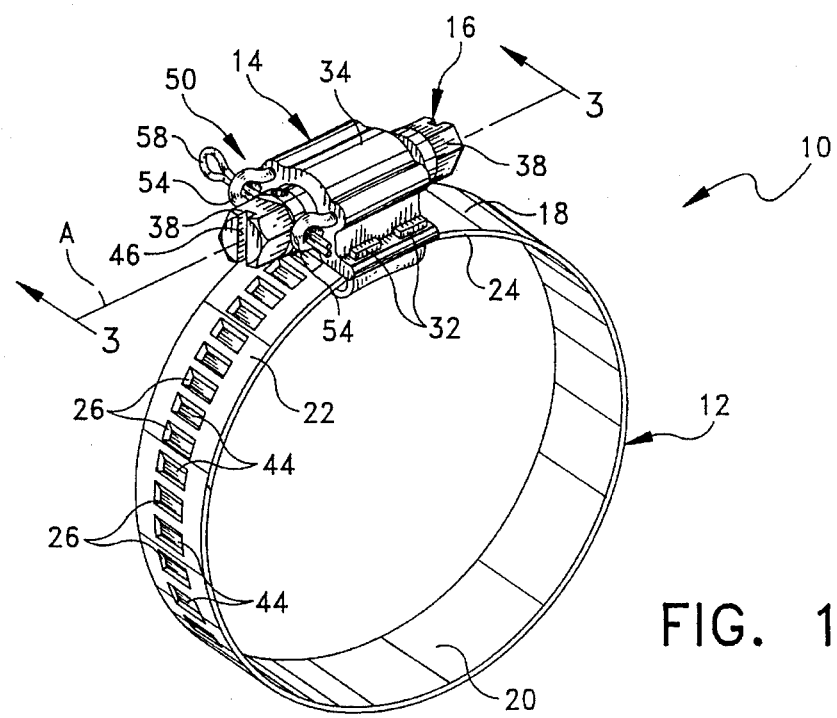
FIG. 1 is a perspective view of a locking clamp assembly of the present invention.

Referring now to the drawings, there is generally indicated at 10 a locking clamp assembly of the present invention for clamping separate parts together, such as a hose to a fitting or one end of a hose to another (not shown). As illustrated in the drawings, the locking clamp assembly 10 comprises a circular band generally indicated at 12, a housing generally indicated at 14 which is mounted on the band 12, and a screw generally designated 16 which is received by the housing 14.

The circular band 12 is fabricated from strong, but flexible material, such as sheet metal or plastic, and includes an outer surface 18, an inner surface 20, and first and second free end portions 22 and 24. In use, the inner surface 20 of the band 12 engages the parts which are to be attached, such as a hose when clamping a hose to a fitting or to another hose. The band 12 should be of sufficient strength so as not to deform when applying a strong clamping force; thus, stainless steel is a preferable material for many applications. The band 12 further includes a series of indentations or recesses, each indicated 26, formed in the outer surface 18 of the band from a point adjacent to the free end of the first end portion 22 to approximately the midpoint of the band 12. As shown, the indentations 26 are generally rectangular-shaped and extend crosswise with respect to the length of the band 12. It should be understood that the indentations 26 could be openings, however, for ease of manufacturing, indentations are preferred.

Figure 2:
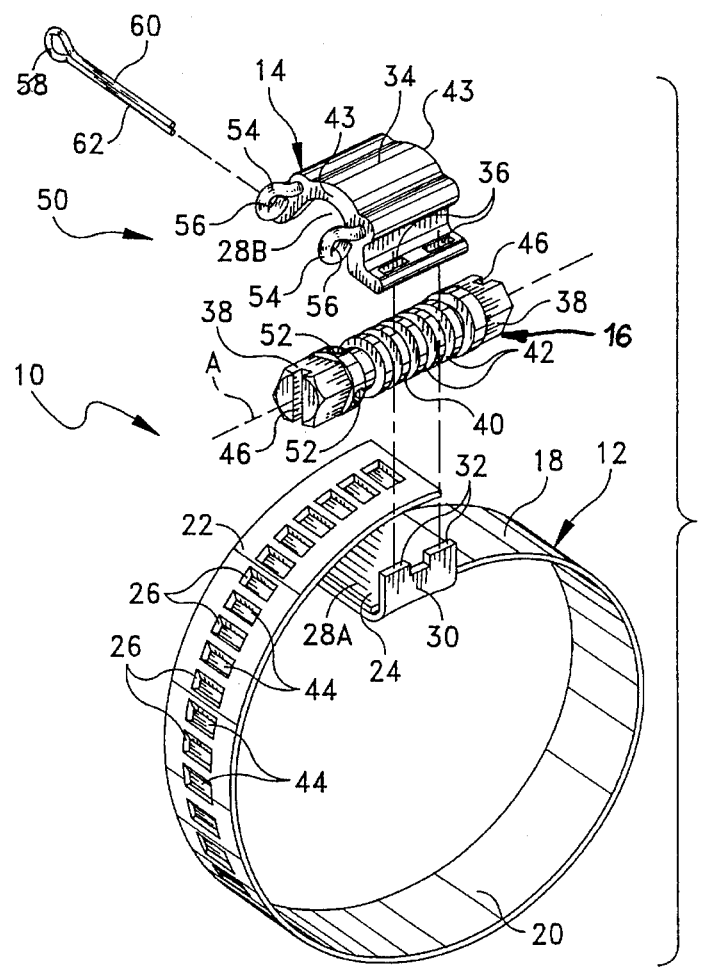
FIG. 2 is an exploded perspective view thereof.
Figure 3:
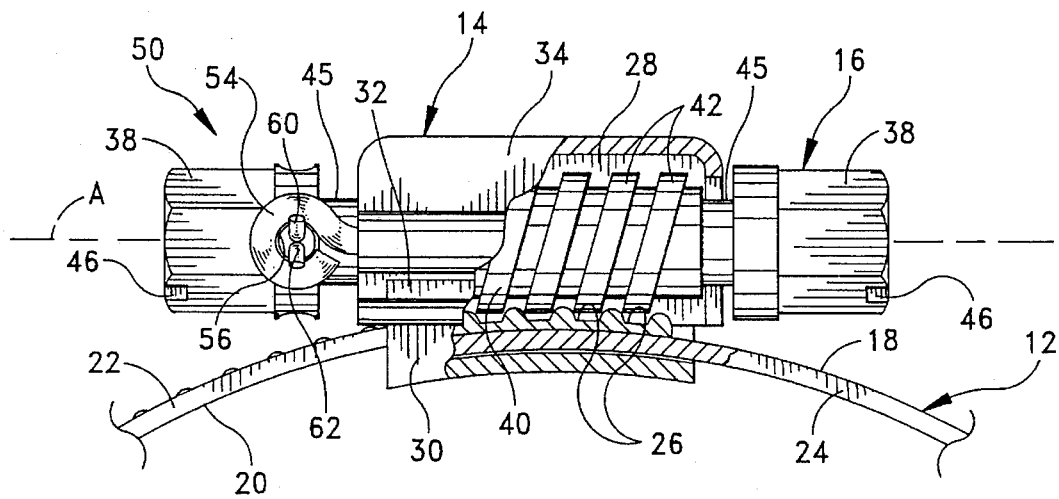
FIG. 3 is an enlarged cross-sectional view taken along line 3—3 of FIG. 1.
Figure 4:
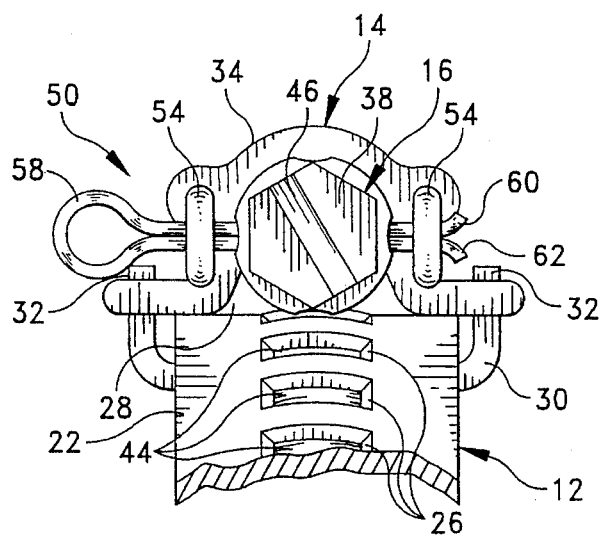
FIG. 4 is an enlarged fragmentary end view of a locking device of the locking clamp assembly.
Figure 5:
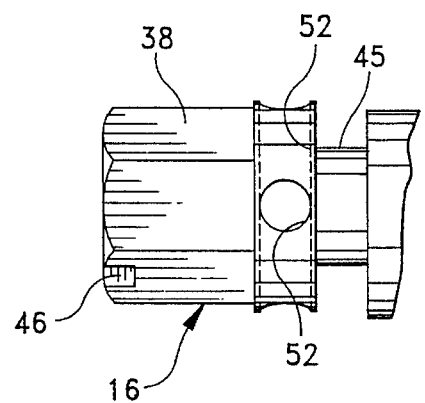
FIG. 5 is an enlarged fragmentary view similar to FIG. 3 with portions removed for illustrating a screw of the locking clamp assembly.

Mounted on the second end portion 24 of the band 12 is the housing 14 which has a channel 28 (FIGS. 3 and 4) formed therein for receiving the first end portion 22 of the band 12 therethrough. More particularly, the housing 14 includes a bottom section 30 mounted on the second end portion 24 of the band 12 on the inner surface 20 of the band by welding or adhesive. The bottom section 30 is generally U-shaped in cross section, having a pair of fingers, each designated 32, extending upwardly from one side of the band 12 and another pair of fingers, also designated 32, extending upwardly from the other side of the band 12. The space between fingers 32 constitutes a channel 28A (FIG. 2), which is sized to receive the first end portion 22 of the band 12. The housing 14 also includes a top section 34 having means for securing the top section to the bottom section, which means includes the provision of slots 36 formed on the sides of the top section 34 which receive the fingers 32 of the bottom section 30 therein. After the top section 34 is mounted on the bottom section 30 in a position such that the fingers 32 of the bottom section 30 are received in the slots 36 of the top section 34, the sections are welded together at their sides for ensuring that they do not come apart, or alternatively the upper edges of fingers 32 could be peened over to effect the desired securement. As shown, the top section 34 is generally of inverted U-shaped, having a channel 28B (FIG. 2) formed therein. Thus, when the top section 34 is mounted on the bottom section 30, the channels 28A and 28B combine to form channel 28 as illustrated in FIGS. 3 and 4. The fingers 32 of the bottom section 30 are spaced apart such that the bottom section guides the movement of the first end portion 22 of the band 12 along the outer surface 18 of the second end portion 24 as illustrated in the drawings.

The screw 16 is disposed within the channel 28B of the top section 34 of the housing 14, the screw having two opposite hex heads, each designated 38, and a threaded portion 40 extending between the heads 38. The threaded portion 40 has a plurality of threads 42 which threadably engage the indentations 26 of the first end portion 22 of the band 12 as illustrated in FIG. 3. The housing 14 has a pair of flanges 43 (FIG. 2) which are disposed within respective grooves 45 (FIG. 3) formed in the screw 16 between the heads 38 and threaded portion 40 for preventing the longitudinal movement of the screw 16 with respect to the housing 14. The arrangement is such that when the screw 16 is tightened (e.g. by a screwdriver or wrench), the first end portion 22 of the band 12 is drawn around the outer surface 18 of the second end portion 24 thereby decreasing the diameter of the circular band 12, and when the screw 16 is loosened, the first end portion 22 moves away from the second end portion 24 thereby increasing the diameter of the band. More particularly, threads 42 engage the recessed surfaces 44 of the indentations 26 for gripping the first end portion 22 so that the turning of the screw 16 causes linear movement of the first end portion 22 of the band 12 to tighten and loosen the circular loop of the band.

The heads 38 of the screw 16 are each formed with a slot 46 (see FIG. 4) for receiving a tool, such as a flat-head screwdriver (not shown), for turning the screw 16 clockwise (the left-hand head as viewed in FIG. 1) to tighten the band 12, or counterclockwise to loosen the band. It should be noted that the heads 38 may be formed for receiving a Phillips-head screwdriver.

The clamping assembly 10 described thus far is substantially identical to standard clamps provided at hardware or plumbing supply stores. However, the present invention represents an improvement over prior clamps by comprising a locking device, generally indicated 50, for releasably locking the screw 16 to the housing 14 in a position wherein the screw 16 is prohibited from turning. Thus, the locking device 50 prevents any unwanted tightening or loosening of the band 12 for maintaining a consistent clamping force even after an extended period of time.

The locking device 50 comprises a pair of bores 52 formed in the screw 16 adjacent the left-hand head 38 of the screw 16 as viewed in FIG. 3. The bores 52 are at ninety degree angles with respect to each other and extend in a transverse direction with respect to a longitudinal axis A of the screw. The locking device 50 also comprises a pair of eyelets, each indicated 54, having aligned eyeholes or openings 56, the eyelets 54 being mounted on opposing sides of the top section 34 of the housing 14 by welding or by adhesive or by being imbedded therein. It is to be understood that the provision of eyelets 54 mounted on the top section 34 of the housing may embody different forms such as aligned openings formed in integral extensions of the housing 14 (not shown) which would be located where the eyelets are located. A person applying the clamp assembly 10 may selectively align one of the bores 52 of the screw 16 with the eyeholes 56 and insert a pin 58 through the eyeholes 56 and bore 52 for preventing the screw 16 from turning. In the present invention, the pin 58 is a cotter pin having flexible, resilient legs 60, 62 which, after being inserted through the eyelets 54 and bore 52, may be spread apart and turned back for preventing the removal of the cotter pin 58 from the housing 14 and screw 16. When the pin 58 is removed, the screw 16 is free to be turned for tightening or loosening the band 12.

It should be observed that the locking device 50 of the present invention prevents the turning of the screw 16 thereby ensuring that the band 12 maintains a tight clamping force. In operation, the band 12 is slipped over the parts to be clamped and an implement, such as a screwdriver, turns the head 38 of the screw 16 clockwise (as viewed in FIG. 1) to tighten the clamping force of the band 12 (i.e., thereby reducing the diameter of the band). Once sufficiently tightened, the screw 16 is rotated such that one of the bores 52 provided near the head 38 of the screw 16 is aligned with the eyelets 54 of the housing 14. After they are aligned, a cotter pin 58 is inserted through the eyelets 54 and bore 52 and the legs 60, 62 of the cotter pin 58 are spread apart for preventing the removal of the pin from the housing 14 and screw 16. To remove the clamp assembly 10 from the parts, the legs 60, 62 of the cotter pin 58 are straightened and the pin 58 is removed from the eyelets 54 and the bore 52. Once removed, the screw 16 may be turned counterclockwise for loosening the clamping force of the band 12 thereby enabling the removal of the clamping assembly from the parts.

It should also be observed that since both heads 38 are formed with slots 46, the locking clamp assembly 10 may be tightened or loosened from either side thereof in case one of the heads is inaccessible. However, it should be understood that the locking device need only be provided at one end of the screw 16 for preventing the turning of the screw.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A locking clamp assembly for clamping separate parts together, said assembly comprising:

a band of flexible material forming a circular loop, said band having first and second free end portions and a series of indentations formed in the outer surface of the band along the length of the band at the first end portion;

a housing having top and bottom portions, said bottom portion integrally formed from said second free end portion of said band;

said housing mounted on the second end portion of the band, said housing having a channel formed therein which receives the first end portion of the band therethrough;

a screw disposed within said channel along a longitudinal axis, said screw having a head portion and a threaded portion with a plurality threads which threadedly engage the indentations of the first end portion of the band so that turning of said screw causes linear movement of said first end of the band to tighten or loosen the circular loop formed by said band, said head portion further having a pair of bores formed therein, said bores extending at ninety degree angles with respect to each other and in a transverse direction with respect to the longitudinal axis of said screw; and a locking device for releasably locking the screw to the housing in a position wherein the screw is prohibited from turning thereby preventing the tightening and loosening of the band, said locking device comprising two opposed separate eyelets formed in the outer surface of said housing and extending outwardly therefrom toward the head of said screw to be selectively aligned with one of the bores of the screw, and a pin extending through one of the selectively aligned bores of the screw and the opening of the housing for preventing the turning of the screw, whereby when the pin is removed, the screw is free to be turned for tightening or loosening the band.

* * * * *